United States Patent
Lin et al.

(10) Patent No.: US 7,680,293 B2
(45) Date of Patent: Mar. 16, 2010

(54) LOUDSPEAKER APPARATUS

(75) Inventors: Chi-Hsiung Lin, Taipei (TW);
Hsiang-Ti Hsu, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 1171 days.

(21) Appl. No.: 11/261,567

(22) Filed: Oct. 31, 2005

(65) Prior Publication Data

US 2006/0256999 A1  Nov. 16, 2006

(30) Foreign Application Priority Data

May 12, 2005 (TW) .................. 200510068838 A

(51) Int. Cl.
*H04R 25/00* (2006.01)
(52) U.S. Cl. .................. 381/349; 381/152; 381/182
(58) Field of Classification Search .................. 381/423, 381/152, 431, 345, 395, 349, 182
See application file for complete search history.

(56) References Cited

U.S. PATENT DOCUMENTS

| 4,772,513 | A | 9/1988 | Sakamoto et al. |
|---|---|---|---|
| 5,206,466 | A | 4/1993 | Inamiya et al. |
| 5,701,359 | A | 12/1997 | Guenther et al. |
| 6,516,072 | B1 * | 2/2003 | Vinogradov et al. ........ 381/160 |
| 6,665,413 | B1 * | 12/2003 | Domen ........................ 381/349 |
| 6,817,084 | B2 | 11/2004 | Tokusho et al. |
| 6,819,767 | B1 | 11/2004 | Funahashi et al. |
| 6,834,744 | B2 | 12/2004 | Toki |
| 6,843,345 | B2 | 1/2005 | Koizumi et al. |
| 7,113,607 | B1 * | 9/2006 | Mullins ........................ 381/96 |
| 7,382,890 | B2 * | 6/2008 | Saiki et al. .................. 381/152 |
| 2005/0025330 | A1 * | 2/2005 | Saiki et al. .................. 381/388 |
| 2005/0271232 | A1 * | 12/2005 | Sumiyama et al. .......... 381/350 |
| 2008/0247582 | A1 * | 10/2008 | Guenther .................... 381/332 |

* cited by examiner

*Primary Examiner*—Suhan Ni
*Assistant Examiner*—Jasmine Pritchard
(74) *Attorney, Agent, or Firm*—Rabin & Berdo, P.C.

(57) ABSTRACT

A loudspeaker apparatus includes a speaker unit and a front cover. The speaker unit generates acoustic waves according to an external electronic signal. The front cover located in front of the speaker unit includes a plurality of elastic spacers and a diaphragm, and the elastic spacers and the diaphragm form an enhanced chamber, such, that the acoustic waves generated by the speaker unit go through the enhance chamber, and then drives the diaphragm to generate the acoustic waves again.

4 Claims, 6 Drawing Sheets

US 7,680,293 B2

LOUDSPEAKER APPARATUS

PRIORITY STATEMENT

This Non-provisional application claims priority under 35 U.S.C. §119(a) on Patent Application No(s). 200510068838.5 filed in China, P.R.C. on May 12, 2005, the entire contents of which are hereby incorporated by reference.

BACKGROUND

1. Field of Invention

The present invention relates to loudspeaker apparatus and particularly to a loudspeaker that has an enhanced chamber located in front of a speaker unit.

2. Related Art

"Audio" literally means, "I hear" in Latin. The human ear can hear a frequency range between 16 and 1600 Hz. In a broad definition, any things that can generate sound may be called an audio source. For instance, a compact disk (CD), langspielplatte (LP), recording tape, FM/AM broadcasting, a microphone and the like are audio sources. Some audio sources cannot generate sound audible to human beings, so an electronic device has to be used to generate and transmit electronic signals, and a speaker has to be used to broadcast the sound audible to human ears. In one aspect, any device that can generate sound and receive electronic signals can be called a speaker.

The acoustic wave is a vibration generated by a solid, liquid or gas medium under pressure. The acoustic wave generated by the speaker is formed by vibration of a diaphragm after having received electronic signals that cause alteration of air pressure in the surrounding environment, and then the acoustic wave is received by human ears to become audible sound.

There are many types of speakers on the market. FIG. 1 illustrates a conventional speaker 10, which includes a closed cabinet 100, a diaphragm 110, a damper 120, a magnetic member 130, a voice coil 140 and a frame 150. The diaphragm 110, damper 120, magnetic member 130 and voice coil 140 are mounted onto the frame 150 to form a speaker unit that can generate sound. Then the speaker unit is installed on the closed cabinet 100.

The voice coil 140 is located on one end of the diaphragm 110 corresponding to the magnetic member 130, and located in the magnetic field generated by the magnetic member 130. When the electric signal passes through the voice coil 140, a magnetic force alteration occurs that interacts with the magnetic field of the magnetic member 130. The voice coil 140 alters according to the electronic signal. And the magnetic member 130 is attracted or repulsed to drive the diaphragm 110 outwards or inwards and lead to a conical portion of the diaphragm 110 moving like a piston for generating acoustic waves by compressing or releasing air. The cabinet 100 at the rear end of the speaker unit aims to prevent offsetting of the air pressure alterations in front of the diaphragm 110 and on the rear side of the diaphragm 110. The material, closed effect and mounting location of the cabinet 100 determine the acoustic characteristics generated by the speaker unit.

Production techniques of the speaker are known in the art. For instance, U.S. Pat. No. 6,817,084 discloses a fabrication technique for speakers that include a magnetic circuit disposed in a center hole of a bracket with a voice coil, a voice coil bobbin, a frame and a pole yoke mounting thereon to improve the acoustic quality of the speaker.

The interior space of a vehicle for installing the speaker is limited and the seating positions of listeners may be not symmetrical, so it is more difficult for the speaker to generate desired acoustic characteristics, tone and sound volume on a vehicle than a normal environment. In addition, the decorations of vehicle, which may have acoustic absorption and acoustic reflex effects, may cause phenomena such as resonance, stationary wave, time lag, phase deviation, phase difference, and the like. Hence installing the speaker on the vehicle is a great challenge. U.S. Pat. No. 6,819,767 discloses a sound reproduction apparatus for vehicles. It has a left-channel voice coil and a right-channel voice coil coupled co-axially on a voice coil bobbin. U.S. Pat. No. 6,843,345 also discloses a speaker for vehicles that is easily to be installed on the car door. Also, the platform space from the rear seat to rear glass can be used as a resonant chamber for the speaker installed on the platform behind the rear seat. As the conventional speaker generally is quite bulky, in recent years a panel speaker has been developed. U.S. Pat. No. 5,701,359 discloses a related technique. In the technique, a voice coil is attached to the bottom side of a diaphragm, and then installs adequate dampers and magnetic members to drive the diaphragm to generate acoustic waves. The panel speaker is much thinner than the conventional speaker, but its medium and bass sound effect is not as rich and desirable as the conventional speaker. Its output power also is lower than that of the conventional speaker. Moreover, the panel speaker has a narrower sound spectrum than the conventional speaker due the limitation of its structure. As the technique of the conventional speaker is well developed, it is still the mainstream of the market, and is not yet widely replaced by the new panel speaker.

The diaphragm is the key element of sound effect in the speaker. It may be made from a wide variety of materials, but paper is mostly used as main material. However, after World War II, polymer film has been gradually adopted for making diaphragms. Recently, a vacuum plating technique has been developed that can deposit a thin layer of metal carbon on the diaphragm by vaporization. Besides, making a large and thin diaphragm is quite difficult because the effects of material properties, thickness, type and thickness of the plating film, and supporting method will affect its quality somehow. Also, during the production, time, temperature and humidity are factors to be considered. Related fabrication techniques can be found in U.S. Pat. Nos. 5,206,466, 4,772,513 and 5,701,359.

In addition, installing the speaker on small electronic devices such as mobile phones, personal digital assistants (PDAs), or notebook computers also is a big concern. U.S. Pat. No. 6,834,744 discloses a related technique. The objects of the patent are to reduce the positive phase and negative phase phenomena, to reduce the size of speaker, and to obtain louder volume. It mainly installs a speaker unit in a mobile phone. Also, the mobile phone has a front acoustic aperture on the backside to emit sound from the front side of the speaker unit. The speaker unit further has a rear acoustic aperture on the rear side, so sound can be emitted from a memory card slot on one side of the mobile phone. Thus it provides two acoustic wave-traveling channels.

The aforesaid conventional techniques propose many techniques to improve the sound effect of the speaker, that take into account physical characteristics, a device structure, material, internal element configuration and the like. However, most conventional speakers have to rely on a cabinet located on the rear side of the speaker unit. Otherwise, the sound effect is not rich enough and the sound volume is smaller.

In terms of handheld data processing devices such as mobile phone and PDA, they already have other electronic elements located therein. There is little room available for installing the speaker, so the sound effect and volume is also limited. If the sound volume is driven to the maximum level, the air at the front side of the speaker unit will be offset with each other and broken sound is generated.

Moreover, the conventional handheld data processing devices generally have a small rear cabinet attached to the case. The case has a corresponding sound emission aperture on the front side to emit sound, but external articles such as dusts easily enter the case through the aperture and result in degrading of the sound effect of the speaker. The electronic elements located inside also are affected.

SUMMARY

In view of the aforesaid issues, the present invention provides a loudspeaker apparatus that gets rid of the cabinet resonant chamber on the rear side of the speaker unit. It has an enhanced chamber on the front side of the speaker unit that can improve the acoustic quality and increase the sound volume of the loudspeaker.

The loudspeaker apparatus according to the invention mainly includes a speaker unit and a front cover. The speaker unit can generate acoustic waves according to external electronic signals. On the other hand, the front cover covers the front side of the speaker unit and consists of a plurality of elastic spacers and a diaphragm that form a closed enhanced chamber. Finally the acoustic waves produced by the speaker unit can drive the diaphragm, to generate sound.

The loudspeaker apparatus thus formed eliminates the disadvantages of the conventional speakers such as a broken sound, small sound volume and the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given in the illustration below only, and thus is not limitative of the present invention, wherein.

DETAILED DESCRIPTION

Figure 1:
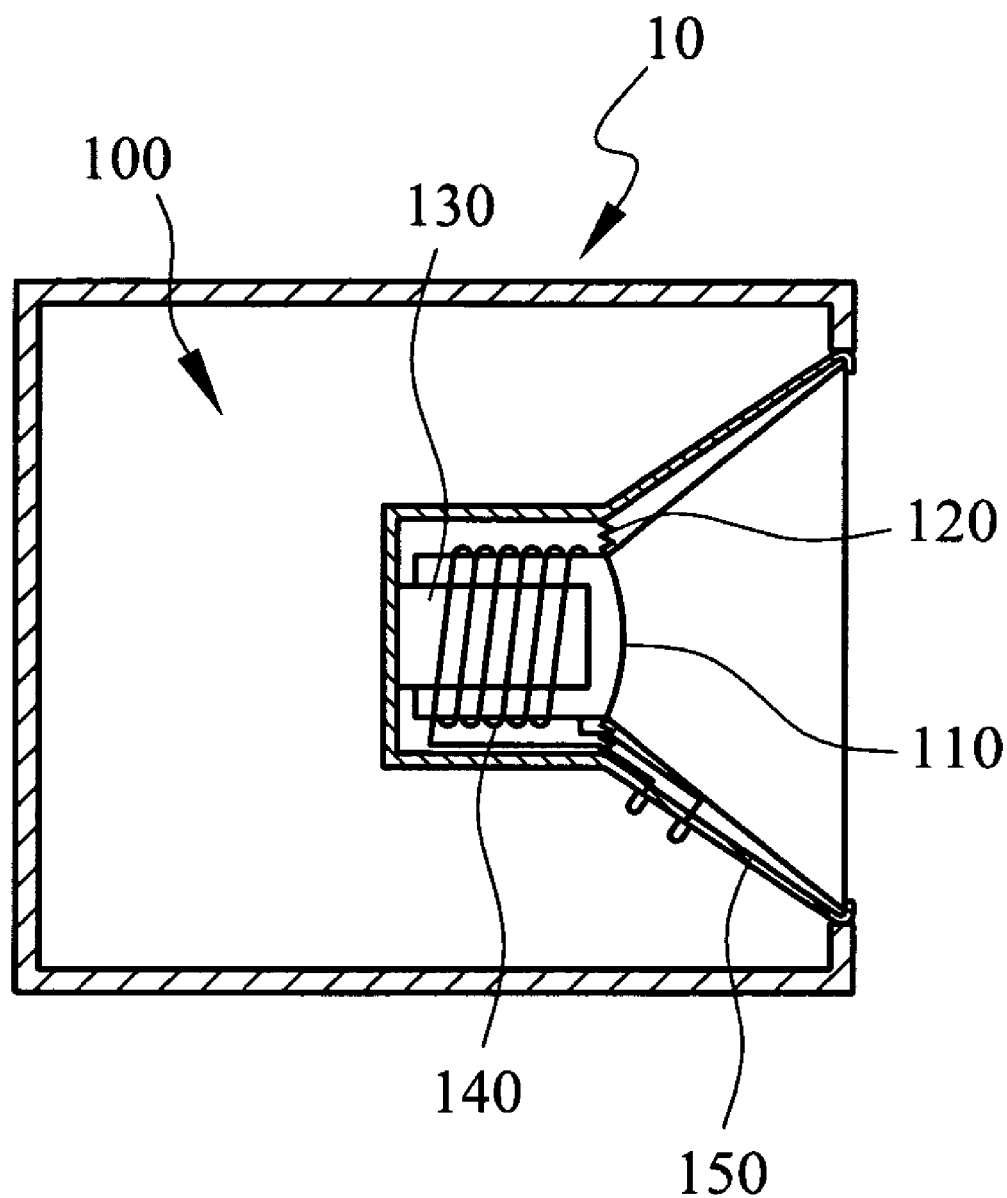
FIG. 1 is a schematic view of a conventional loudspeaker.
Figure 2:
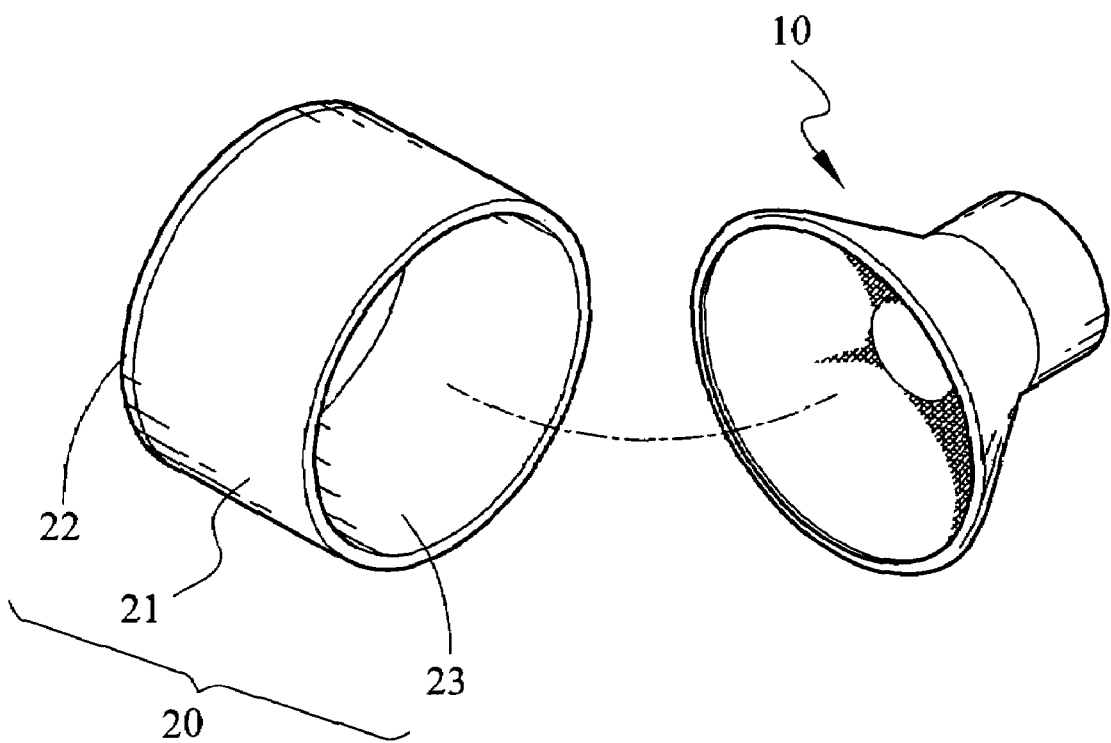
FIG. 2 is a schematic view of a first embodiment of the loudspeaker apparatus of the invention.
Figure 3:
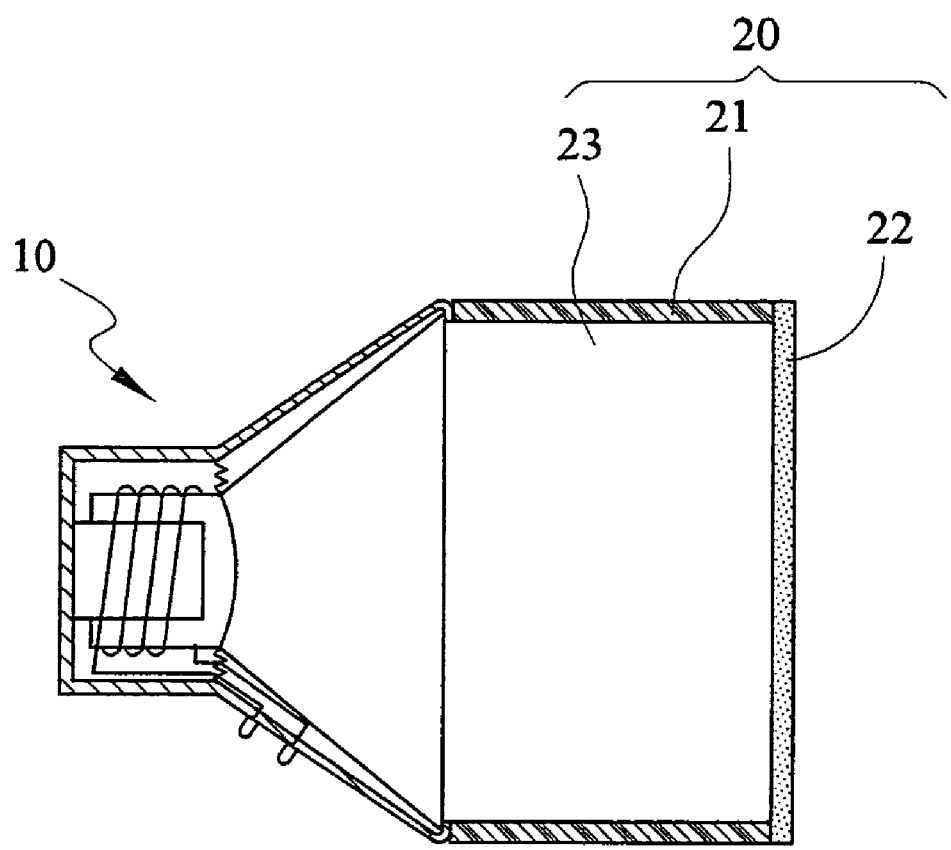
FIG. 3 is a sectional view of the loudspeaker apparatus of the invention.

Refer to FIGS. 2 and 3, a first embodiment of the loudspeaker apparatus of the invention is shown. The present invention of loudspeaker apparatus mainly includes a speaker unit 10 and a front cover 20. The speaker unit 10 may be formed in many different types. In the first embodiment, a conical shape like of the conventional speaker is used as example. In practice the speaker unit 10 contains many other elements, such as a diaphragm 110, a magnetic member 130, a voice coil 140, dampers 120 and the like shown in FIG. 1. Those elements are known in the art, thus are not depicted in the drawings of the embodiments discussed below. Also, they are included in the speaker unit 10 and are generally referred to in the speaker unit 10.

The speaker unit 10 can receive external electronic signals to generate acoustic waves and change its high-and-low sound pitch and volume according to variations of the electronic signals. The front cover 20 is located on a front side of the speaker unit 10, namely on one side where the acoustic waves are generated, and the front cover 20 includes a plurality of elastic spacers 21 and a diaphragm 22. The elastic spacers 21 are coupled with the diaphragm 22 to form a closed enhanced chamber 23 on the front side of the speaker unit 10. The diaphragm 22 may be made from paper, polyester film or the like. In addition, for enhancing the sound generation effect, the surface of the diaphragm 22 may be coated with metal by vaporization. On the other hand, the elastic spacers 21 may have many selections, such as rubber, a sponge, or the like. It may be formed in a desired dimension or according to a selected specification to facilitate replacement and the purpose of the elastic spacers 21mainly aims to hold the diaphragm 22 and form the enhanced chamber 23.

After the speaker unit 10 generates acoustic wave, the acoustic wave moves in the enhanced chamber 23 and drives the diaphragm 22. The diaphragm 22 generates vibration and sends out another acoustic wave, or secondary acoustic wave. After transmitted in the enhanced chamber 23 to the diaphragm 22, the acoustic wave generated by the speaker unit 10 has an improved sound quality and becomes louder, and also eliminates the broken sound occurred to the conventional speaker. In test results, the embodiment show that the loudspeaker apparatus of the invention can boost the sound volume gain many times.

Figure 4:
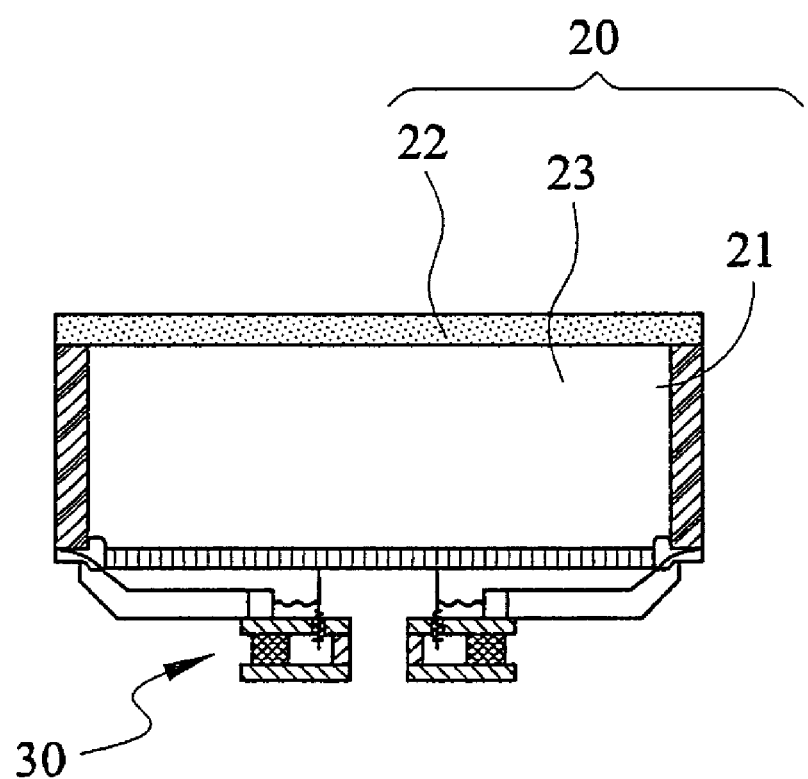
FIG. 4 is a schematic view of a second embodiment of the loudspeaker apparatus of the invention.

Refer to FIG. 4 for a second embodiment of the invention adapted to a panel speaker. In this embodiment, the panel speaker unit 30 is used for generating acoustic waves and the front cover 20 coupled on the front side of the panel speaker unit 30 is also provided. The front cover 20, as previously discussed, includes a plurality of elastic spacers 21 and a diaphragm 22. The elastic spacers 21 and the diaphragm 22 form the enhanced chamber 23. Similarly, the acoustic waves that generated by the panel speaker unit 30 drive the diaphragm 22 to improve the sound quality and increase the sound volume.

Figure 5:
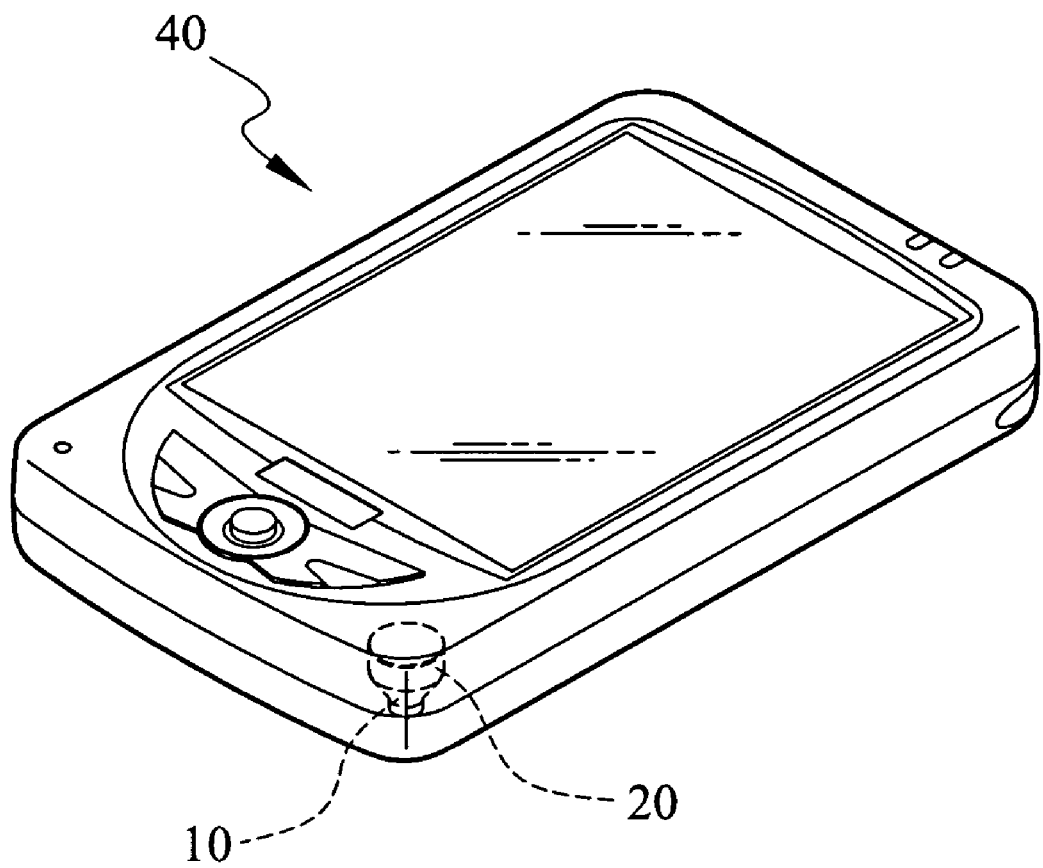
FIG. 5 is a schematic view of a third embodiment of the loudspeaker apparatus of the invention.
Figure 6:
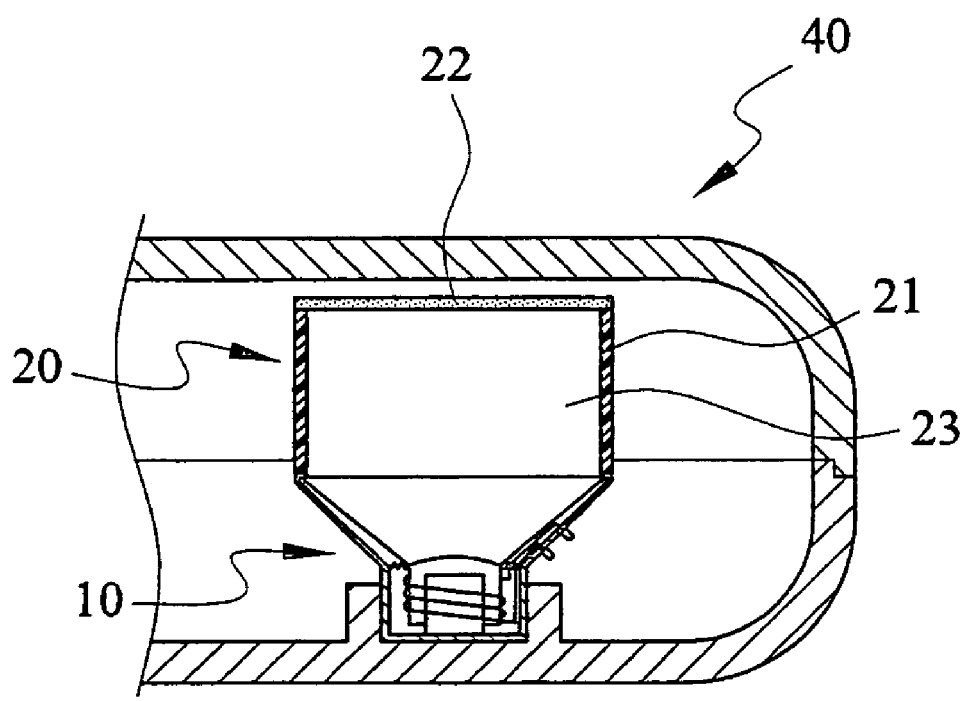
FIG. 6 is a sectional view of the third embodiment of the loudspeaker apparatus of the invention.

The loudspeaker apparatus of the present invention may further be used on, but not limited to, other electronic devices such as PDAs, mobile phones, smart phone, notebook computers, and the like. Refer to FIGS. 5 and 6 for a third embodiment of the invention. It is adopted on a PDA. The speaker unit 10 is located in the PDA and the front cover 20 is located on the front side of the speaker unit 10 to form the enhanced chamber 23. After the speaker unit 10 has generated acoustic waves, a medium, such as air, moves in the enhanced chamber 23 to drive the diaphragm 22. Similarly, the diaphragm 22 generates vibration and sends out another acoustic wave, or the secondary acoustic wave. In other words, after transmitted to the diaphragm 22 through the enhanced chamber 23, the acoustic wave generated by the speaker unit 10 can improve sound quality and become louder, and also eliminate the broken sound occurring to the conventional speaker.

The PDA discussed previously in the third embodiment does not have a cabinet on the rear side of the speaker unit, thus no aperture is formed on the case.

Compared with the conventional techniques that have a cabinet space formed on the PDA and a sound emission aperture on the case that tends to collect external articles such as dusts, and results in a weaker structural strength and increased production cost, the loudspeaker apparatus of the invention may be adopted without changing the original design of the electronic device. No aperture is formed. The appeal of the product is greater. The problems of a broken sound and too small sound volume occurring to the conventional techniques are eliminated. Of cause, the invention also has a simpler structure and can be produced at a lower cost.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A loudspeaker apparatus, comprising:
    a speaker unit for generating acoustic wave according to an external electronic signal; and
    a front cover, covering a front side of the speaker unit the front cover having an elastic spacer and a diaphragm that form a closed enhanced chamber on the front side of the speaker, wherein the diaphragm is a material selected from a group consisting of paper and polyester film, and a surface of the diaphragm includes a metal film coated thereon:
    wherein the acoustic wave generated by the speaker unit is transmitted in the closed enhanced chamber and drives the diaphragm, such that the diaphragm vibrates, thereby producing another acoustic wave.

2. The loudspeaker apparatus of claim 1, wherein the elastic spacer is made from a sponge material.

3. The loudspeaker apparatus of claim 1, wherein the speaker unit is a panel speaker.

4. The loudspeaker apparatus of claim 1, wherein the speaker unit includes a magnetic member, a voice coil, and a diaphragm.

* * * * *